(12) United States Patent
Sakata (10) Patent No.: US 10,061,105 B2
(45) Date of Patent: Aug. 28, 2018

(54) PROJECTION SYSTEM, PROJECTOR, AND CONVERSION LENS FOR PROJECTOR

(71) Applicant: SEIKO EPSON CORPORATION, Tokyo (JP)

(72) Inventor: Hidefumi Sakata, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/412,628

(22) Filed: Jan. 23, 2017

(65) Prior Publication Data

US 2017/0227744 A1    Aug. 10, 2017

(30) Foreign Application Priority Data

Feb. 4, 2016   (JP) ................................. 2016-019525

(51) Int. Cl.
| | |
|---|---|
| G02B 3/00 | (2006.01) |
| G02B 9/00 | (2006.01) |
| G02B 13/16 | (2006.01) |
| G02B 13/08 | (2006.01) |
| G03B 21/14 | (2006.01) |

(52) U.S. Cl.
CPC ............. G02B 13/16 (2013.01); G02B 13/08 (2013.01); G03B 21/142 (2013.01); G03B 21/147 (2013.01)

(58) Field of Classification Search
CPC ...... G02B 13/16; G02B 13/08; G03B 21/147; G03B 21/142

USPC ...................... 359/649, 648, 642; 353/34, 79
See application file for complete search history.

(56) References Cited

U.S. PATENT DOCUMENTS

| | | | |
|---|---|---|---|
| 6,912,094 B2 | 6/2005 | Shigematsu et al. | |
| 8,000,032 B2* | 8/2011 | Yeh ....................... | G02B 15/173 359/715 |
| 8,801,197 B2* | 8/2014 | Morikuni ............... | G02B 13/12 353/101 |
| 9,261,758 B2 | 2/2016 | Kuwata | |
| 9,720,212 B2* | 8/2017 | Otake .................... | G02B 13/04 |
| 2013/0010370 A1* | 1/2013 | Otani ..................... | G02B 13/12 359/668 |

FOREIGN PATENT DOCUMENTS

| | | |
|---|---|---|
| JP | H06-43362 A | 2/1994 |
| JP | 2002-287023 A | 10/2002 |
| JP | 2006-178155 A | 7/2006 |
| JP | 2012-008358 A | 1/2012 |
| WO | 2013/080953 A1 | 6/2013 |

* cited by examiner

*Primary Examiner* — Tuyen Tra
(74) *Attorney, Agent, or Firm* — Oliff PLC (57) ABSTRACT

First to third lens groups that are formed of anamorphic lenses having positive power and anamorphic lenses having negative power combined with one another and allow the distances between the anamorphic lenses to be changed cooperate with one another to allow field curvature to be changed both in the meridian direction and the sagittal direction.

19 Claims, 8 Drawing Sheets

PROJECTION SYSTEM, PROJECTOR, AND CONVERSION LENS FOR PROJECTOR

BACKGROUND

1. Technical Field

The present invention relates to a projection system for enlarging and projecting an image displayed in an image display apparatus, a projector using the projection system, and a conversion lens for a projector.

2. Related Art

As a projection system of a projector, it is known to change the position of a lens to change the curvature of the image plane for image projection on a curved surface other than a flat surface (see WO2013/80953, for example). Further, there is a known projector in which a shape-variable mirror or a non-rotationally-symmetrical lens is provided as part of an optical system that forms the internal section of the main body of a projector for geometrical correction of an image projected on a screen (see JP-A-2006-178155, for example).

In a case where projection is performed on a screen that is not rotationally symmetrical with respect to the optical axis of a projection system, for example, a cylindrical surface, for example, the image formation position in the vertical direction of the screen differs from that in the horizontal direction of the screen. The image formation state therefore varies depending on the position on an image. As a result, high image formation performance over the entire image cannot always be achieved.

SUMMARY

An advantage of some aspects of the invention is to provide a projection system that is used in a case where an image is projected on a light irradiated surface (screen, for example, hereinafter also simply referred to as screen) having a variety of shapes, such as a non-rotationally-symmetrical surface, and allows adjustment in accordance with the surface shape of the light-irradiated surface and hence allows excellent image formation with high image formation performance, a projector using the projection system, and a conversion lens for a projector.

A projection system according to an aspect of the invention is a projection system including lens groups each formed of an anamorphic lens having curvature of a meridian surface and curvature of a sagittal surface (sagittal cross sectional) different from each other, the projection system including a first lens group having positive or negative power, a second lens group having power that differs from the power of the first lens group in terms of sign, and a third lens group having power that coincides with the power of the first lens group in terms of sign, wherein the second lens group is so disposed to be movable between the first lens group and the third lens group. It is assumed that the meridian surface used herein means a surface passing through (or surface containing) the optical axis of the projection system and an object point off the optical axis and typically means a surface passing through the optical axis and extending along the perpendicular direction (vertical direction) of the screen. It is assumed further that the sagittal surface (sagittal cross section) used herein means a surface orthogonal to the meridian surface described above and typically means a surface further passing through (surface further containing) the optical axis of the projection system. It is still further assumed that the anamorphic lens may, for example, be a toric lens having power both in the meridian direction and the sagittal direction with the signs of the two types of power, positive or negative, being the same but the magnitudes thereof being different from each other and a cylindrical lens having power only in one of the directions.

In the projection system described above, the first to third lens groups, which are formed of anamorphic lenses having positive power and anamorphic lenses having negative power combined with one another and allow the distances between the anamorphic lenses to be changed, cooperate with one another to allow the field curvature to be changed both in the meridian direction and the sagittal direction. As a result, in projection performed on a light irradiated surface (screen), for example, having curvature in the vertical direction and curvature in the horizontal direction different from each other, high image formation performance can be maintained over an entire displayed image.

According to a specific aspect of the invention, the second lens group is movable as a whole. In this case, the field curvature can be desirably changed with no change in the size of a light flux passing through the first to third lens groups or the angle of incidence of the light.

According to another aspect of the invention, the third lens group is so arranged as to be fixed with respect to the first lens group. In this case, the distances between the lens groups can be adjusted in accordance with the amount of movement of the second lens group located between the first lens group and the third lens group.

According to still another aspect of the invention, the second lens group is formed of a second-first lens group paired with the first lens group to form a first afocal system and a second-second lens group paired with the third lens group to form a second afocal system. In this case, since the second lens group is the combination of the two afocal systems, for example, the amount of change in the aspect ratio of an image can be suppressed.

According to still another aspect of the invention, the first afocal system and the second afocal system are formed of the same lens group. In this case, the second lens group is formed of one lens. In this case, the symmetry of the optical system allows suppression of unintended changes in the size of the light flux, the angle of incidence of the light, the aspect ratio of an image, and other factors.

According to still another aspect of the invention, each of the anamorphic lenses includes a toric lens. In this case, the amount of curvature in the meridian direction and the amount of curvature in the sagittal direction can be set to differ from each other.

According to still another aspect of the invention each of the anamorphic lenses includes an aspherical lens. In this case, use of an aspherical lens allows an increase in influence on a change in field curvature and suppression of the other aberrations.

According to still another aspect of the invention, the meridian surface of each of the anamorphic lenses is rotatable around an optical axis. In this case, the direction in which the image plane is curved can be rotated.

According to still another aspect of the invention, the projection system further includes an image formation system in a position shifted from the first to third lens groups toward an object side. In this case, the image formation system can enhance the image formation performance on the object side.

A projector according to another aspect of the invention includes an illumination system that outputs light, a light modulator that modulates the light outputted from the illumination system, and any of the projection systems described above, each of which projects the light modulated by the light modulator. In this case, when image projection is performed on projection surfaces having various forms, using the projection system described above allows adjustment according to the surface shape of a light irradiated surface and excellent image formation with high image formation performance.

A conversion lens for a projector according to another aspect of the invention is a conversion lens used for a projector and including lens groups each formed of an anamorphic lens having curvature of a meridian surface and curvature of a sagittal surface different from each other, the conversion lens including a first lens group having positive or negative power, a second lens group having power that differs from the power of the first lens group in terms of sign, and a third lens group having power that coincides with the power of the first lens group in terms of sign, wherein the second lens group is so disposed to be movable between the first lens group and the third lens group.

In the conversion lens (converter) for a projector described above, the first to third lens groups, which are formed of anamorphic lenses having positive power and anamorphic lenses having negative power combined with one another and allow the distances between the anamorphic lenses to be changed, cooperate with one another to allow the field curvature to be changed both in the meridian direction and the sagittal direction. As a result, in projection performed on a light irradiated surface having curvature in the vertical direction and curvature in the horizontal direction different from each other, for example, attaching the conversion lens to the projection system of a projector allows adjustment according to the surface shape of a light irradiated surface to be made and high image formation performance to be maintained.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A projector that incorporates an image display apparatus according to a first embodiment of the invention will be described below in detail with reference to the drawings.

Figure 1:
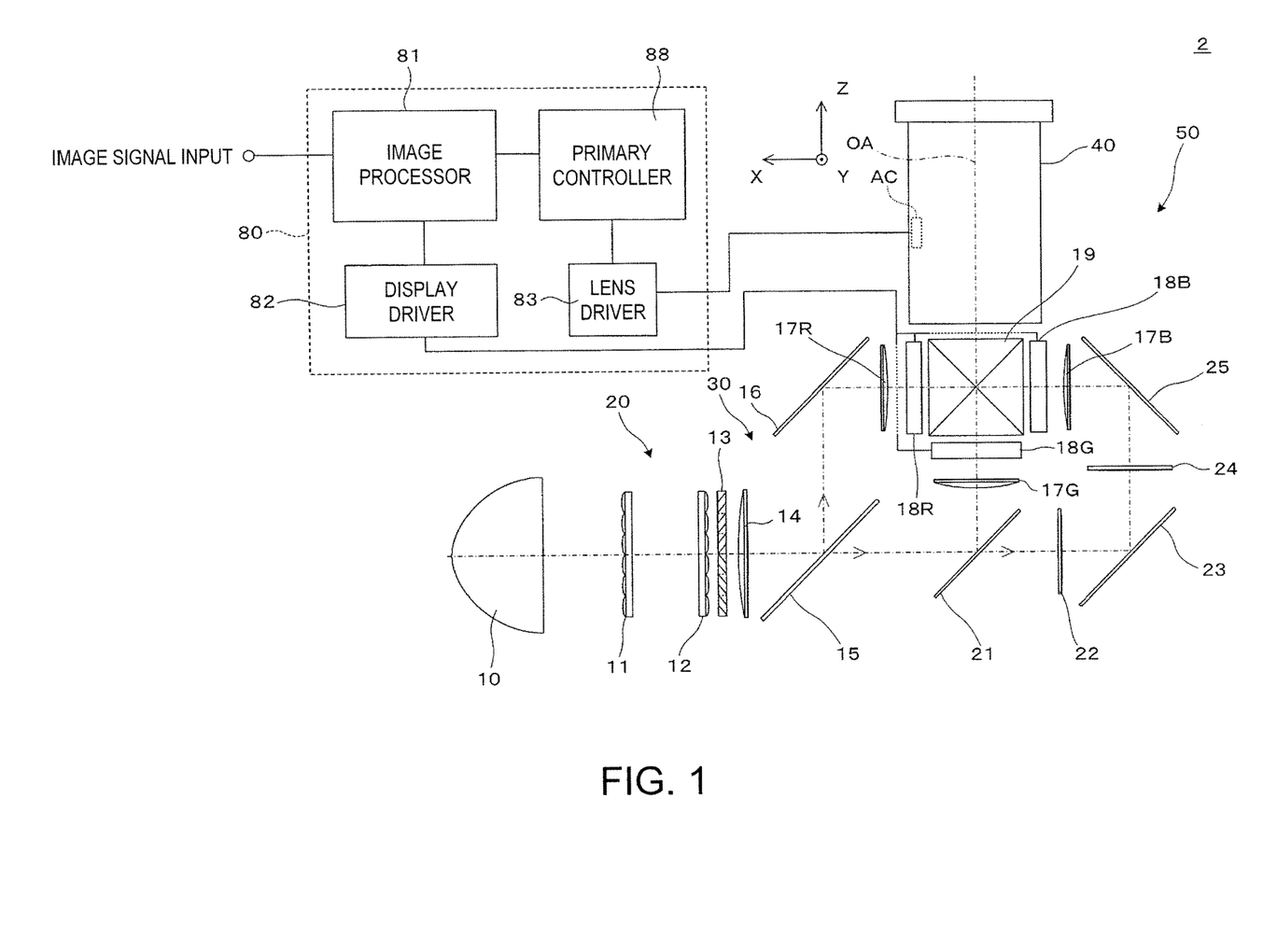
FIG. 1 shows a schematic configuration of a projector according to a first embodiment.
Figure 2:
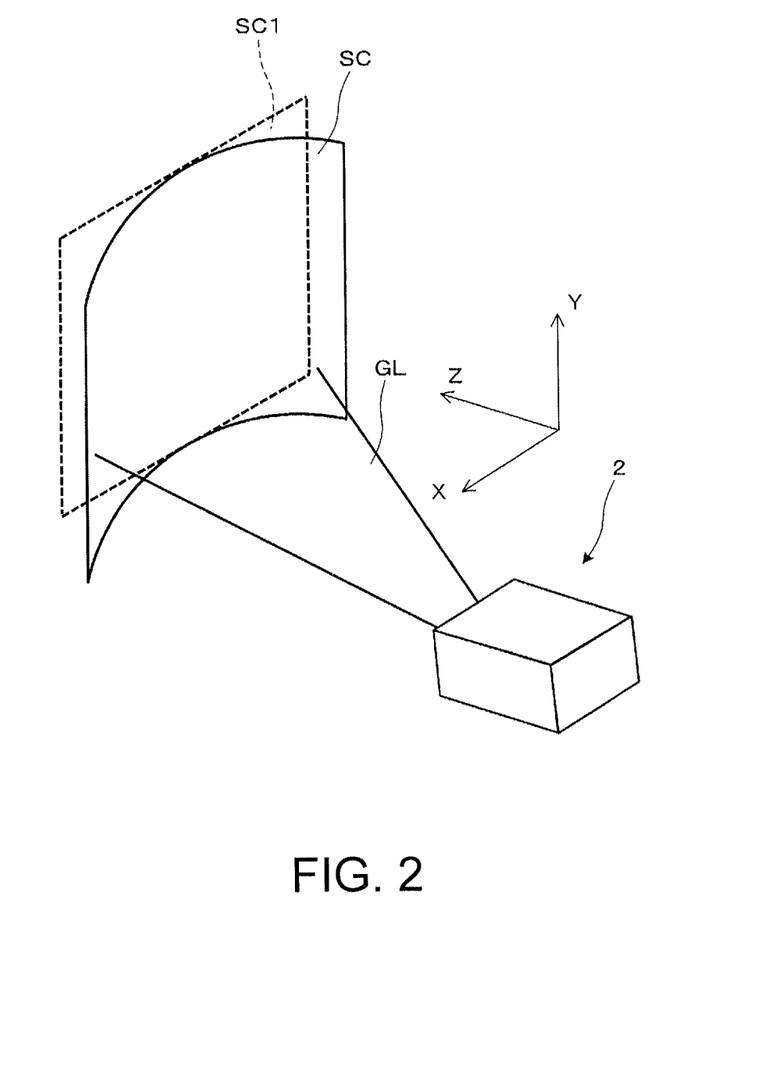
FIG. 2 conceptually shows projection performed by the projector on a screen.

A projector 2 according to the first embodiment of the invention includes an optical system section 50, which projects, as the projector 2, image light, and a circuit apparatus 80, which controls the action of the optical system section 50, as shown in FIGS. 1 and 2. The projector 2 projects video light GL, with which a screen SC, which is a light irradiated surface, is irradiated, as shown in FIG. 2. The screen SC, which is a light irradiated surface, is curved, as compared with an imaginary flat screen SC1, as shown in FIG. 2.

The configuration and other factors of the projector 2 will be described below in detail with reference to FIG. 1. First, the optical system section 50 includes an illumination system 20, which includes a light source 10, which emits illumination light, and outputs color light fluxes, a color separating/guiding system 30, which separates the illumination light into the color light fluxes and guides the separated color light fluxes, light modulators 18, which spatially modulate the color light fluxes having exited out of the color separating/guiding system 30, a cross dichroic prism 19, which is a light combining system that combines the color light fluxes (modulated light fluxes) having passed through the light modulators 18, and a projection system 40, which projects the combined light that is formed of the color light fluxes combined with one another.

In the optical system section 50, the illumination system 20 includes a first optical integration lens 11, a second optical integration lens 12, a polarization conversion element 13, and a superimposing lens 14 as well as the light source 10.

The light source 10 is, for example, an ultrahigh-pressure mercury lamp and emits light containing R light, G light, and B light. The light source 10 may be a discharge light source other than an ultrahigh-pressure mercury lamp or a solid-state light source, such as an LED and a laser.

Each of the first optical integration lens 11 and the second optical integration lens 12 has a plurality of lens elements arranged in an array. The first optical integration lens 11 divides the light flux from the light source 10 into a plurality of light fluxes. The lens elements of the first optical integration lens 11 bring the light flux from the light source 10 into focus in the vicinity of the lens elements of the second optical integration lens 12. The lens elements of the second optical integration lens 12 cooperate with the superimposing lens 14 to form images of the lens elements of the first optical integration lens 11 on panel portions of liquid crystal light valves 18R, 18G, and 18B. The configuration described above allows display areas of the liquid crystal light valves 18R, 18G, and 18B to be so illuminated with the light from the light source 10 that roughly uniform illuminance is achieved over the entire display areas.

The polarization conversion element 13 converts the light from the second optical integration lens 12 into predetermined linearly polarized light. The superimposing lens 14 superimposes the images of the lens elements of the first optical integration lens 11 on one another via the second optical integration lens 12 on the display areas of the liquid crystal light valves 18R, 18G, and 18B.

The color separating/guiding system 30 includes dichroic mirrors 15 and 21, reflection mirrors 16, 23, and 25, relay lenses 22 and 24, and field lenses 17R, 17G, and 17B.

The first dichroic mirror 15 reflects the R light incident through the superimposing lens 14 but transmits the G light and the B light incident therethrough. The R light reflected off the first dichroic mirror 15 travels via the reflection mirror 16 and the field lens 17R and impinges on the liquid crystal light valve 18R, which is a light modulator. The liquid crystal light valve 18R modulates the R light in accordance with an image signal to form an R image.

The second dichroic mirror 21 reflects the G light through the first dichroic mirror 15 but transmits the B light therethrough. The G light reflected off the second dichroic mirror 21 travels via the field lens 17G and impinges on the liquid crystal light valve 18G, which is a light modulator. The liquid crystal light valve 18G modulates the G light in accordance with an image signal to form a G image. The B light having passed through the second dichroic mirror 21 travels via the relay lenses 22 and 24, the reflection mirrors 23 and 25, and the field lens 17B and impinges on the liquid crystal light valve 18B, which is a light modulator. The liquid crystal light valve 18B modulates the B light in accordance with an image signal to form a B image.

The liquid crystal light valves 18R, 18G, and 18B, which form the light modulators 18, include non-self-luminous liquid crystal panels that modulate the spatial distributions of the intensity of the color light fluxes that are three illumination light fluxes incident on the liquid crystal light valves and corresponding to the three colors (red, green and blue). In other words, the liquid crystal light valves 18R, 18G, and 18B each include a light-transmissive liquid crystal pixel matrix (liquid crystal panel). Specifically, the liquid crystal light valves 18R, 18G, and 18B each include a liquid crystal pixel matrix, a light-incident-side polarizer provided on the light incident side of the pixel matrix, and a light-exiting-side polarizer provided on the light exiting side of the pixel matrix. Controlled action of each of the liquid crystal light valves 18R, 18G, and 18B will be briefly described below. First, the circuit apparatus 80, which is a projector controller, converts an inputted image signal into an image light valve control signal. The converted image light valve control signal then controls a panel driver that is not shown. The three liquid crystal light valves 18R, 18G, and 18B driven with the controlled panel driver modulate the three color light fluxes to form images according to the inputted image information (image signal).

The cross dichroic prism 19 is a light combining prism, combines the modulated light fluxes from the liquid crystal light valves 18R, 18G, and 18B to form image light, and directs the image light toward the projection system 40.

The projection system 40 is a projection lens (projecting lens) that enlarges the combined image light (video light) from the cross dichroic prism 19 and projects the enlarged image light on the curved screen SC (see FIG. 2), which is the light irradiated surface. The projection system 40 will be described in detail with reference to FIG. 3 and other figures. In the present embodiment, in particular, the projection system 40 includes a plurality of lens groups formed of anamorphic lenses having curvature of the meridian surface and curvature of the sagittal surface (sagittal cross section) different from each other. Each of the anamorphic lenses is assumed to be formed, for example, of a toric lens having power in the meridian direction and power in the sagittal direction different from each other or a cylindrical lens having power only in one of the directions. When the projection system 40 includes lens groups formed of a combination of positive and negative anamorphic lenses and allowed to be adjusted in terms of position, and when an image is projected on a screen (light irradiated surface) having a variety of shapes, adjustment according to the surface shape of the light irradiated surface can be made, and excellent image formation can be performed with high image formation performance.

The circuit apparatus 80 includes an image processor 81, to which an external image signal, such as a video signal, is inputted, a display driver 82, which drives, on the basis of an output from the image processor 81, the liquid crystal light valves 18R, 18G, and 18B provided in the optical system section 50, a lens driver 83, which causes a drive mechanism (not shown) provided in the projection system 40 to operate to adjust the state of the projection system 40, and a primary controller 88, which oversees and controls the action of the circuit sections 81, 82, and 83 and other portions.

The image processor 81 converts the inputted external image signal into an image signal containing grayscales of each color and other factors. The image processor 81 can also perform a variety of types of image processing, such as distortion correction and color correction, on the external image signal.

The display driver 82 can cause the liquid crystal light valves 18R, 18G, and 183 to operate on the basis of the image signal outputted from the image processor 81 and can cause the liquid crystal light valves 18R, 18G, and 18B to form images corresponding to the image signal or images corresponding to the original images on which image processing is performed.

The lens driver 83 operates under the control of the primary controller 88 and moves as appropriate, via an actuator AC, part of the optical elements that form the projection system 40 along an optical axis OA. The lens driver 83 can thus perform focusing and other types of operation when an image is projected through the projection system 40 on the screen, for example, with the projection distance changed. The lens driver 83 can further change the perpendicular position of an image projected on the screen by adjusting the amount of tilting, in which the entire projection system 40 is moved in the upward/downward direction orthogonal to the optical axis OA.

Figure 3:
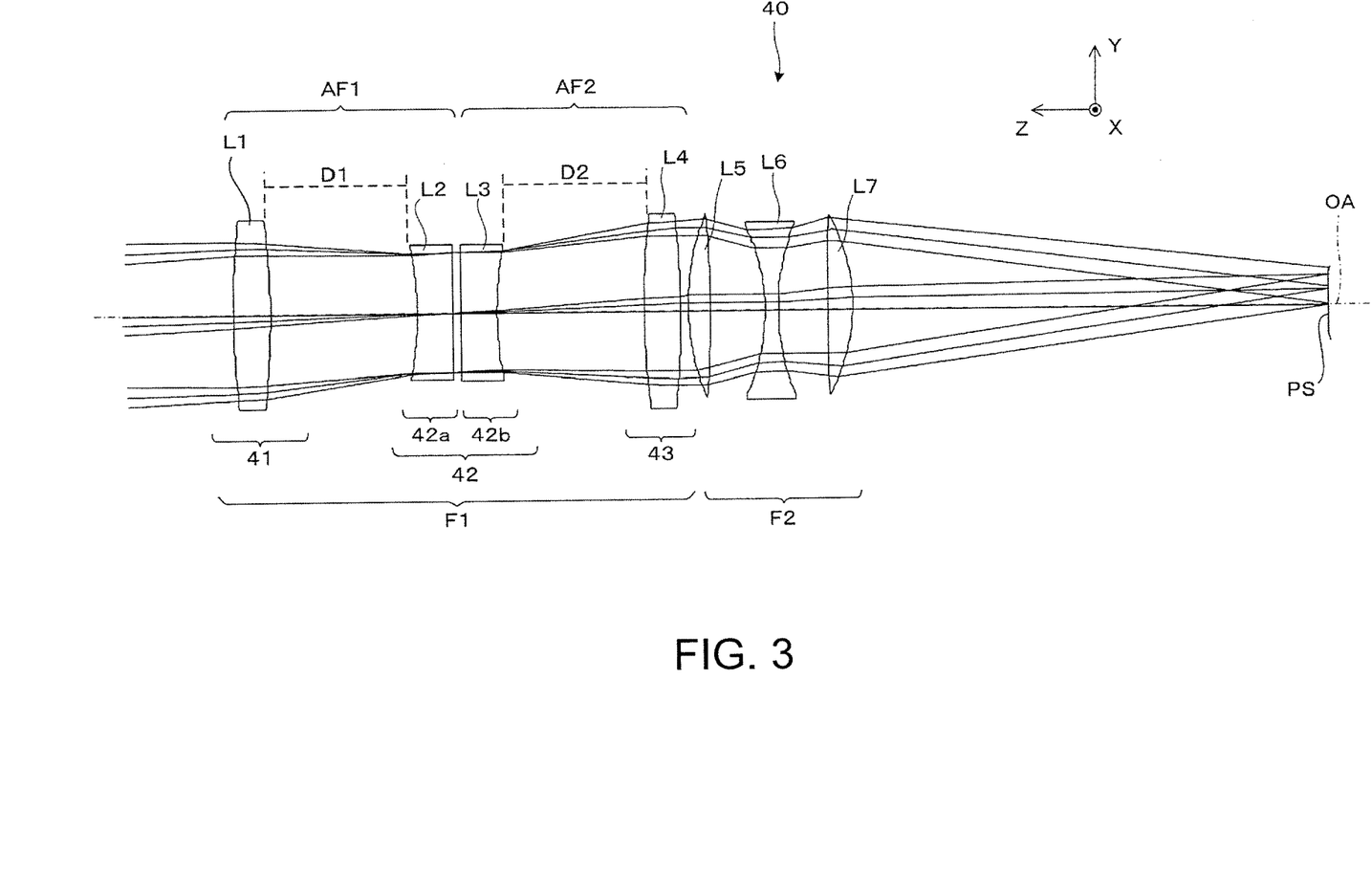
FIG. 3 shows the configuration of a projection system in the first embodiment and light rays traveling therethrough.

The configuration of the optical system portion of the projection system 40 in the present embodiment will be specifically described below with reference to FIG. 3. FIG. 3 is a cross-sectional view of the projection system 40 taken along the direction along a meridian surface (vertical direction) of the constituent optical systems and shows the configuration of the projection system 40 and light rays traveling therethrough. The projection system 40 is formed of a field curvature control section F1 and an image formation section (image formation system) F2 arranged in this order from the magnifying side (image side), as shown in FIG. 3.

In the projection system 40, the field curvature control section F1, which is formed of a combination of a plurality of anamorphic lenses, can adjust, alone or in conjunction with another optical system, the amount of curvature resulting from the field curvature (distortion) produced by the entire projection system 40 and also suppress the amount of other aberrations for adjustment of the image formation position. The configuration of the field curvature control section F1 will now be specifically described. The field curvature control section F1 is formed of a first lens group 41 (lens group having positive power) formed of a first lens L1, which is a positive anamorphic lens, a second lens group 42 (lens group having power different from power of first lens group 41 in terms of sign (negative power)) formed of second and third lenses L2, L3, which are two negative anamorphic lenses, and a third lens group 43 (lens group having power that coincides with power of first lens group 41 in terms of sign (positive power)) formed of a fourth lens L4, which is a positive anamorphic lens. The first lens L1 and the fourth lens L4 are formed of the same lens, that is, have the same shape and are made of the same material. The second lens L2 and the third lens L3 are formed of the same lens, that is, have the same shape and are made of the same material.

The second lens group 42, which is formed of the two lenses L2 and L3, can be taken as the combination of a second-first lens group 42a (second lens L2), which is paired with the first lens group 41 (first lens L1), and a second-second lens group 42b (third lens L3), which is paired with the third lens group 43 (fourth lens L4). In the present embodiment, the first lens group 41, which is a positive lens group (one biconvex lens), and the second-first lens group 42a, which is a negative lens group (one biconcave lens), are paired with each other to form a first afocal system AF1. Similarly, the third lens group 43, which is a positive lens group (one biconvex lens), and the second-second lens group 42b, which is a negative lens group (one biconcave lens), are paired with each other to form a second afocal system AF2. That is, the first lens group 41 and the second-first lens group 42a form an afocal optical system, and light incident on the afocal optical system in parallel to the optical axis thereof exits in parallel to the optical axis. The same holds true for the third lens group 43 and the second-second lens group 42b. Further, in this case, the field curvature control section F1 as a whole also forms an afocal optical system. In the configuration described above, the first lens group 41 and the third lens group 43 are each a positive lens group and coincide with each other in terms of the sign of power, positive or negative. On the other hand, the first lens group 41 and the second lens group 42 differ from each other in terms of the sign of power, positive and negative.

In the projection system 40, the image formation section F2, which is an image formation system, for example, has a triplet lens formed of three lenses L5 to L7 arranged therein, as shown in FIG. 3. The image formation section F2 corrects a variety of aberrations excluding field curvature (distortion) to enhance image formation performance on each object plane (panel surface) PS.

In the configuration described above, in the field curvature control section F1, the first lens group 41 and the third lens group 43 are fixed groups that are fixed in the direction along the optical axis OA. In other words, the arrangement of the third lens group 43 with respect to the first lens group 41 is fixed, and the distance therebetween is maintained constant. On the other hand, the second lens group 42 is a movable group so arranged as to be movable in the direction along the optical axis OA (Z direction) between the first lens group 41 and the third lens group 43, for example, by using the actuator AC (see FIG. 1) or any other device or manually operating a cam mechanism. In particular, the second-first lens group 42a and the second-second lens group 42b, which form the second lens group 42, are movable as a whole. In this case, when the position of the second-first lens group 42a with respect to the first lens group 41 is determined, the arrangement of the second-second lens group 42b with respect to the third lens group 43 is also determined at the same time. Further, in this case, the distance D1 from the first lens group 41 to the second-first lens group 42a and the distance D2 from the third lens group 43 to the second-second lens group 42b are both variable, but the total distance of the two distances (D1+D2) is fixed. In the field curvature control section F1, the symmetry of the constituent optical systems and the regulation on the inter-lens movement suppress unintended changes in the size of the light flux, the angle of incidence of the light, the aspect ratio of an image, and other factors but allow change in the amount of curvature resulting from field curvature.

For example, in a case where the field curvature control section F1 is an afocal system which is formed only of a set of a positive anamorphic lens and a negative anamorphic lens, changing the positional relationship between the two lenses may undesirably change the aspect ratio as well as the amount of curvature. In contrast, in the present embodiment, the first to third lens groups 41 to 43 described above form the two sets of afocal systems AF1 and AF2, which have a symmetrical configuration, whereby the undesirable situation described above is avoided.

Examples of the relationship between the movement of the second lens group 42 and change in the amount of curvature resulting from field curvature will be described below with reference to FIGS. 4A to 4C. To simplify the description, in place of change in the amount of curvature of an actual projection surface (image plane) resulting from field curvature, the change will be described by expressing light convergence in the vicinity of the object-side panel surface (object plane) PS corresponding to the change in the projection surface (image plane) in the form of the shape of the panel surface (object plane) PS.

Figure 4A:
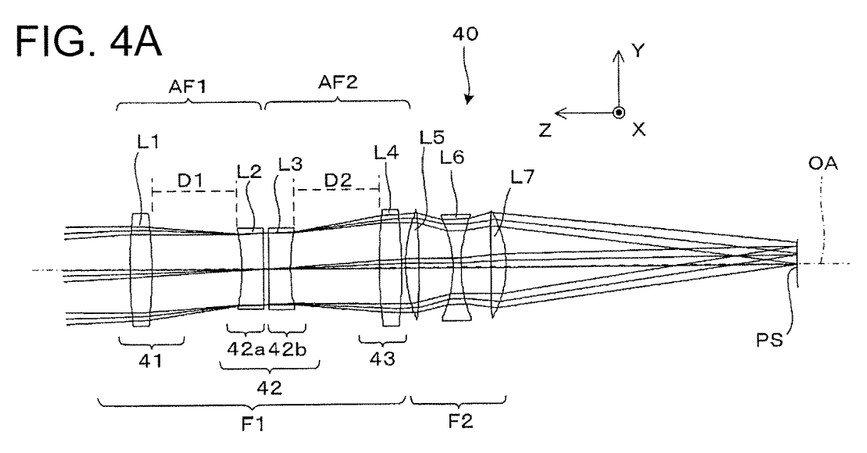
FIG. 4A describes an example of a case where a curved image plane is formed, FIG. 4B describes an example of a case where a roughly flat image plane is formed, and FIG. 4C describes an example of a case where a curved image plane reversed from the curved image plane in FIG. 4A is formed.

FIG. 4A is a view corresponding to FIG. 3. It is assumed by way of example in the description that the distance D1 from the first lens group 41 to the second-first lens group 42a is 20 mm, and that the distance D2 from the third lens group 43 to the second-second lens group 42b is 20 mm. In this case, in the panel surface (object plane) PS, the field curvature produced by the field curvature control section F1 achieves a curved image formation plane having negative curvature, as shown in FIG. 4A. This state corresponds to a similarly curved projection surface. On the other hand, in the field curvature control section F1, when the second lens group 42 (two negative lenses) is moved by 4 mm along the optical axis OA toward the −Z side (right side in FIG. 4B) to achieve a state in which the distance D1 is 24 mm and the distance D2 is 16 mm, the state of the curvature of the panel surface PS changes from the negative state toward a positive state, and an image is formed over a roughly flat plane, as shown in FIG. 4B. This state corresponds to a state in which the projection surface is similarly roughly flat. Further, in the field curvature control section F1, when the second lens group 42 (two negative lenses) is further moved by 1 mm from the state shown in FIG. 4B along the optical axis OA toward the −Z side (right side in FIG. 4B) to achieve a state in which the distance D1 is 25 mm and the distance D2 is 15 mm, a positive curvature state is achieved, as shown in FIG. 4C. That is, the curved shape of the image formation plane is reversed from the curved shape in FIG. 4A. This state corresponds to a state in which the projection surface is similarly curved but reversed from the curved projection surface shown in FIG. 4A. As described above, moving the position of the second lens group 42, which is part of the lens groups that form the field curvature control section F1, allows adjustment of the shape of the image plane and the direction in which the image plane is curved, positively or negatively.

Figure 4B:
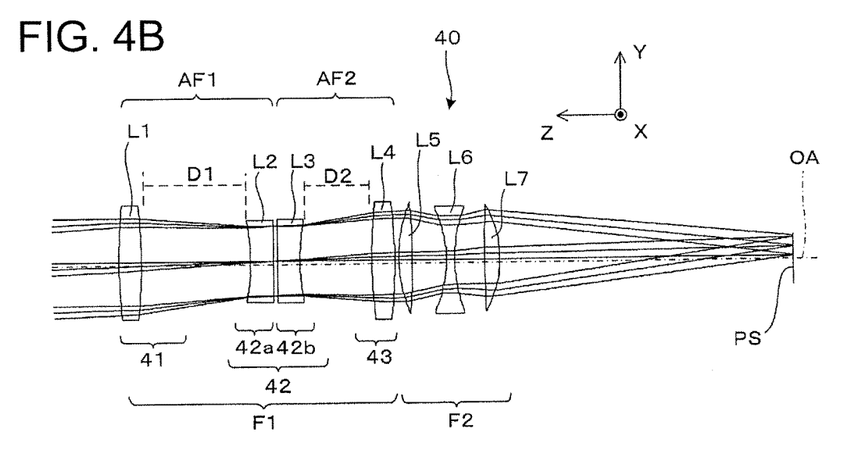
Figure 4C:
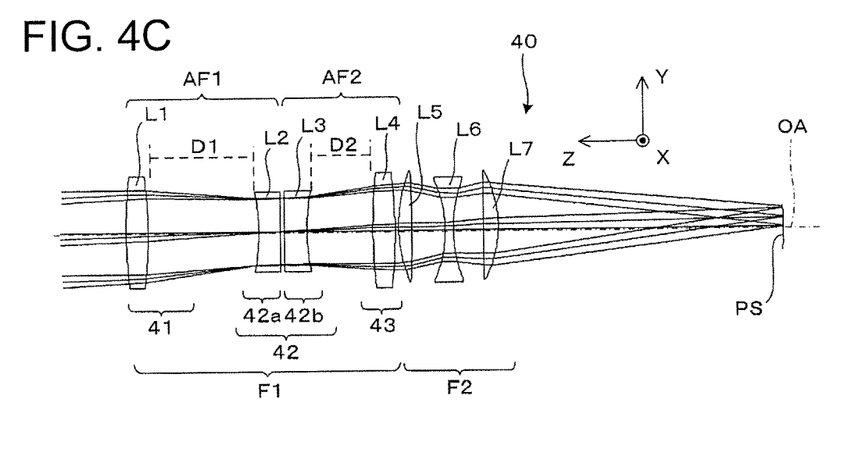

The above description with reference to FIGS. 4A to 4C is presented by way of example, and the shape of the image plane changes in a variety of manners in accordance with the shape, design, and other factors of the lens surface of each lens to be used. For example, the relationship between the direction in which the second lens group 42 is moved and the direction in which the image plane is curved may be reversed, and the relationship between the amount of movement of the second lens group 42 and the amount of curvature may vary. For example, when the shape of each lens surface is an aspherical surface (that is, aspherical lens is employed), it is conceivable that the amount of curvature can be increased with respect to the same amount of movement of the second lens group 42 with the other aberrations suppressed. Further, only the lens surfaces of the lenses (lenses L2 and L3) that form the second lens group 42, which is a movable group, are not necessarily aspherical surfaces, and the lens surfaces of the lenses (lenses L1 and L4) that form the first and third lens groups 41, 43, each of which is a fixed group, may also be aspherical surfaces.

As described above, FIGS. 3 and 4A to 4C are cross-sectional views taken along the direction along a meridian surface of the constituent optical systems (vertical direction), and the same holds true for the direction along a sagittal surface (horizontal direction) orthogonal to the direction described above (vertical direction). In a case where the first to third lens groups 41 to 43, which form the field curvature control section F1 and are formed of anamorphic lenses, are formed, for example, of toric lenses, each of which has power in the meridional direction and power in the sagittal direction different from each other, the degree of change in curvature, that is, the degree of change in the shape of the image plane differs between the vertical direction and the horizontal direction. It is, however, noted that the relationship between the direction in which the second lens group 42 is moved and the direction in which the image plane is curved is the same as those shown in FIGS. 4A to 4C. Therefore, even when the light irradiated surface has a shape that causes the projection distance thereto to change in the vertical direction and in the horizontal direction, excellent image formation with high image formation performance over the entire surface can be performed. That is, appropriate projection can be performed with the amount of curvature adjusted on a light irradiated surface having a variety of shapes, for example, a rugby-ball-shaped surface, by using the configuration of a toric lens used as the field curvature control section F1. Further, for example, as long as aberration (distortion, in particular) correction can be made by an amount necessary for the entire projection system 40 even when a cylindrical lens or a toric lens similar thereto is used as the field curvature control section F1, field curvature is produced only in the direction along the meridian surface, and projection can be performed on a screen having a shape that is not rotationally symmetrical with respect to the optical axis of the projection system, such as a cylindrical surface.

Figures 5A, 5B:
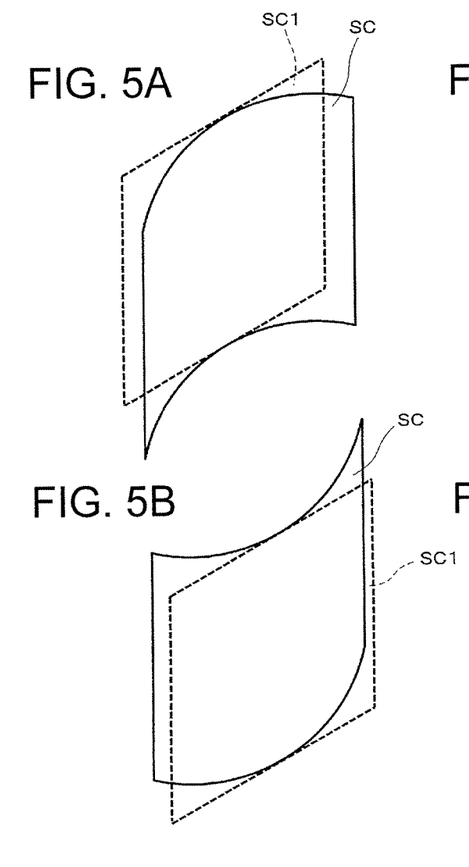
FIGS. 5A to 5F conceptually show examples of the shape of the screen, which is a light irradiated surface.
Figure 5C:
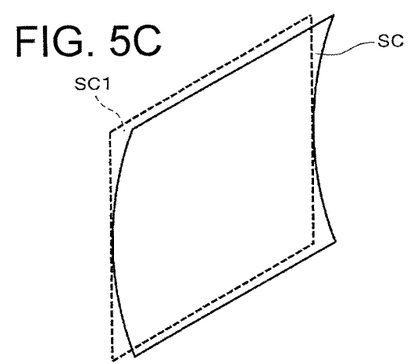
Figure 5D:
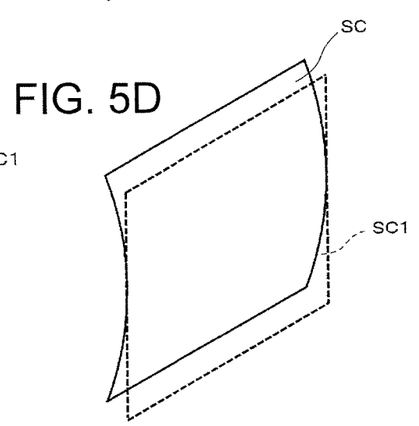
Figure 5E:
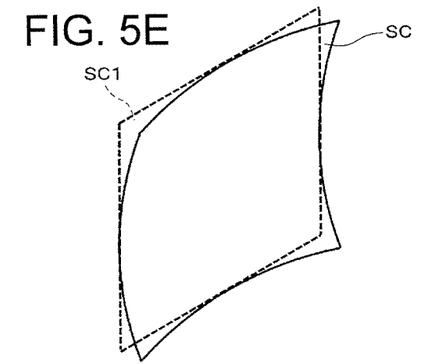
Figure 5F:
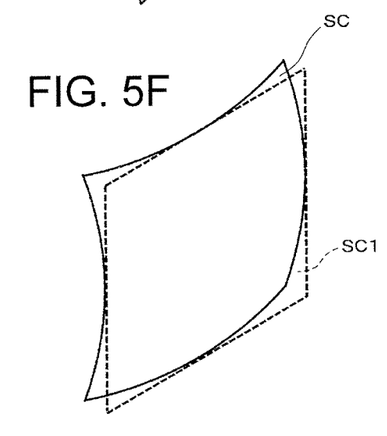

FIGS. 5A to 5F show examples of the shape of the screen SC as an example of the light irradiated surface having a variety of shapes to which the invention is directed. For example, the invention is applicable to a case where the image plane is curved along the horizontal direction (X direction), as compared with the flat imaginary screen SC1, as shown in FIGS. 5A and 5B, a case where the image plane is curved along the vertical direction (Y direction), as compared with the flat imaginary screen SC1, as shown in FIGS. 5C and 5D, and a case where the image plane is curved along the horizontal direction (X direction) and the vertical direction (Y direction), as compared with the flat imaginary screen SC1, as shown in FIGS. 5E and 5F.

As described above, in the projection system and the projector according to the present embodiment, the first to third lens groups 41 to 43, which are formed of anamorphic lenses having positive power and anamorphic lenses having negative power combined with one another and allow the distances between the anamorphic lenses to be changed, cooperate with one another to allow the field curvature to be changed both in the meridian direction and the sagittal direction. As a result, in projection performed on a light irradiated surface (screen), for example, having curvature in the vertical direction and curvature in the horizontal direction different from each other, high image formation performance can be maintained over an entire displayed image.

The above description is presented by way of example, and a variety of changes can be made. For example, the first afocal system AF1 and the second afocal system AF2 are formed of lens groups having the same shape and a highly symmetrical configuration in the above description. Instead, for example, the first afocal system AF1 and the second afocal system AF2 may be formed of lens groups having shapes and other factors slightly different from each other.

In the afocal systems AF1 and AF2, or from a different point of view, in the first to third lens groups 41 to 43, each of the constituent optical systems or the lens groups is formed of one or two lenses, but not necessarily, and each of the lens groups may be formed of two lenses or three or more lenses. For example, each of the first lens group 41 and the third lens group 43 can be formed of two or more lenses, and part of the constituent lenses can each be an aspherical lens. Further, an aspherical lens having high-order coefficients may be employed for enhancement of the influence of distortion on peripheral light.

Second Embodiment

A projection system 140 according to a second embodiment of the invention will be described below in detail with reference to FIGS. 6A to 6C. In the present embodiment, in the projection system 140, the structures of first to third lens groups 141 to 143, that is, the structures of the portions excluding the field curvature control section F1 are the same as those in the projection system and the projector shown in the first embodiment, and a detailed structure of the entire projector will not be described or illustrated.

Figure 6A:
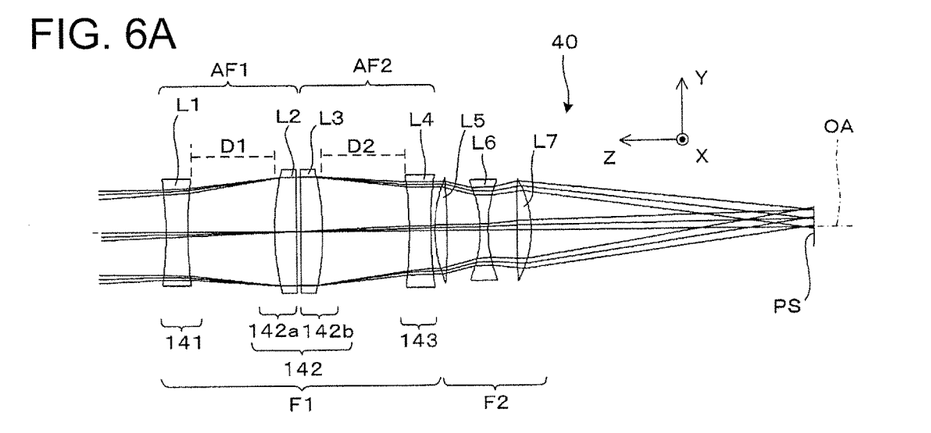
FIG. 6A shows the configuration of a projection system in a second embodiment and light rays traveling therethrough and describes an example of a case where a curved image plane is formed, FIG. 6B describes an example of a case where a roughly flat image plane is formed, and FIG. 6C describes an example of a case where a curved image plane reversed from the curved image plane in FIG. 6A is formed.
Figure 6B:
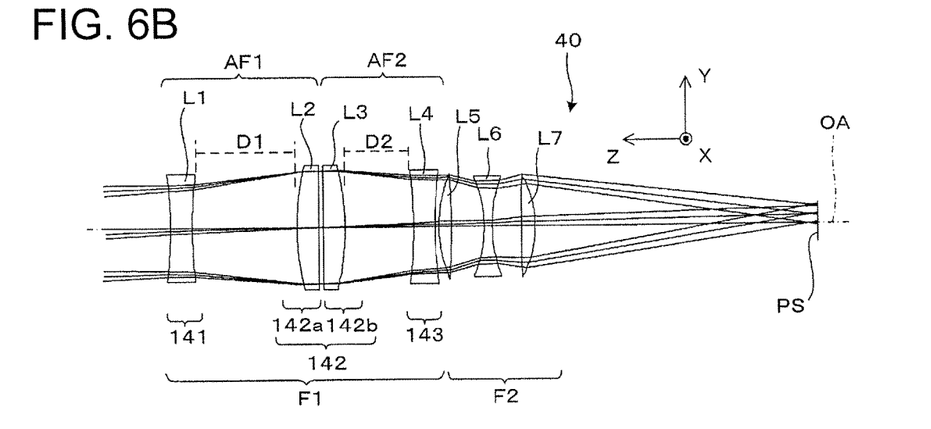
Figure 6C:
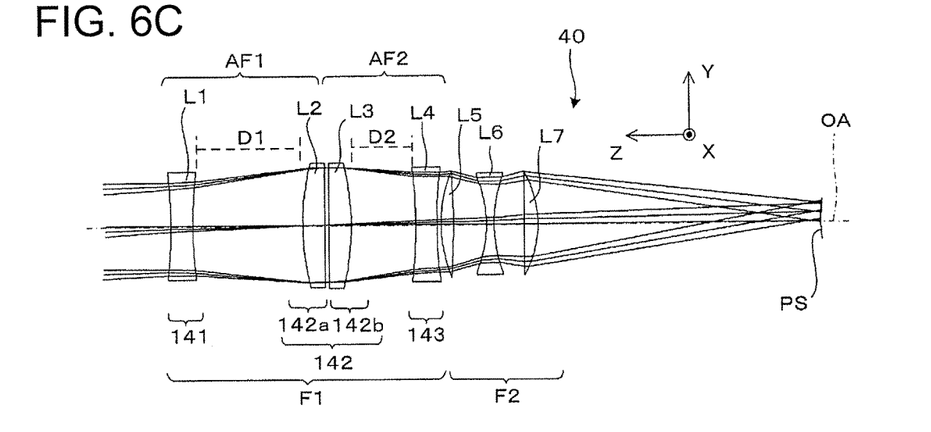

FIGS. 6A to 6C are views corresponding to FIGS. 4A to 4C and are cross-sectional views taken along the direction along a meridian surface of the constituent optical systems (vertical direction). The projection system 140 shown in FIG. 6A and other figures is formed of a field curvature control section F1 and an image formation section (image formation system) F2 arranged in this order from the magnifying side (image side), and the field curvature control section F1 is formed of first to third lens groups 141 to 143, which are formed of anamorphic lenses, as in the case shown in FIG. 3 and other figures. In the present embodiment, the lenses that form the first to third lens groups 141 to 143 differ from those in the first embodiment in terms of the sign of power, positive or negative.

The difference will be specifically described. First, the first lens group 141 is formed of a first lens L1 (one biconcave lens), which is a negative lens, as shown, for example, in FIG. 6A. That is, the first lens group 141 is a lens group having negative power. Next, the second lens group 142 is formed of second and third lenses L2, L3 (two biconvex lenses), which are two positive lenses. That is, the second lens group 142 is a lens group that differs from the first lens group 141 in terms of the sign of power (lens group having positive power). Lastly, the third lens group 143 is formed of a fourth lens L4 (one biconcave lens), which is a negative lens. That is, the third lens group 143 is a lens group that coincides with of the first lens group 141 in terms of the sign of power (lens group having negative power). The first lens L1 and the fourth lens L4 are formed of the same lens, that is, have the same shape and are made of the same material. The second lens L2 and the third lens L3 are formed of the same lens, that is, have the same shape and are made of the same material.

A second-first lens group 142a (second lens L2) of the second lens group 142 is paired with the first lens group 141 (first lens L1) to form a first afocal system AF1, and a second-second lens group 142b (third lens L3) of the second lens group 142 is paired with the third lens group 143 (fourth lens L4) to form a second afocal system AF2. In this case, the field curvature control section F1 as a whole is also an afocal optical system. Further, in the configuration described above, the first lens group 141 and the third lens group 143 are each a positive lens group and coincide with each other in terms of the sing of power, negative or positive. On the other hand, the first lens group 141 and the second lens group 142 differ from each other in terms of the sign of power, negative and positive.

Examples of the relationship between the movement of the second lens group 142 and change in the amount of curvature resulting from field curvature will be described below with reference to FIGS. 6A to 6C.

In the example shown in FIG. 6A, it is assumed that the distance D1 from the first lens group 141 to the second-first lens group 142a is 20 mm, and that the distance D2 from the third lens group 143 to the second-second lens group 142b is 20 mm. In this case, in the panel surface (object plane) PS, the field curvature produced by the field curvature control section F1 achieves a curved image formation plane having positive curvature, as shown in FIG. 6A. On the other hand, in the field curvature control section F1, when the second lens group 142 (two positive lenses) is moved by 4 mm along the optical axis OA toward the −Z side (right side in FIG. 6B) to achieve a state in which the distance D1 is 24 mm and the distance D2 is 16 mm, the state of curvature of the panel surface PS changes from the positive state toward a negative state, and an image is formed over a roughly flat plane, as shown in FIG. 6B. Further, in the field curvature control section F1, when the second lens group 142 (two positive lenses) is further moved by 1 mm from the state shown in FIG. 6B along the optical axis OA toward the −Z side (right side in FIG. 6B) to achieve a state in which the distance D1 is 25 mm and the distance D2 is 15 mm, a negative curvature state is achieved, as shown in FIG. 6C. That is, the curved image formation plane is reversed from the curved shape in FIG. 6A. As described above, moving the position of the second lens group 142, which is part of the lens groups that form the field curvature control section F1, allows adjustment of the shape of the image plane and the direction in which the image plane is curved, positively or negatively. Further, FIGS. 6A to 6C are cross-sectional views taken along the direction along a meridian surface of the constituent optical systems (vertical direction), and the same holds true for the direction along a sagittal surface (horizontal direction) orthogonal to the direction described above (vertical direction).

Also in the projection system and the projector according to the present embodiment, the first to third lens groups 141 to 143, which are formed of anamorphic lenses having positive power and anamorphic lenses having negative power combined with one another and allow the distances between the anamorphic lenses to be changed, cooperate with one another to allow the field curvature to be changed both in the meridian direction and the sagittal direction. As a result, in projection performed on a light irradiated surface (screen), for example, having curvature in the vertical direction and curvature in the horizontal direction different from each other, high image formation performance can be maintained over an entire displayed image.

Third Embodiment

A projection system and a projector according to a third embodiment of the invention will be described below in detail with reference to FIG. 7. In the present embodiment, in a projection system 240, the structures of first to third lens groups 241 to 243, that is, the structures of the portions excluding the field curvature control section F1 are the same as those in the projection system and the projector shown, for example, in the first embodiment, and a detailed structure of the entire projector will not be described or illustrated.

Figure 7:
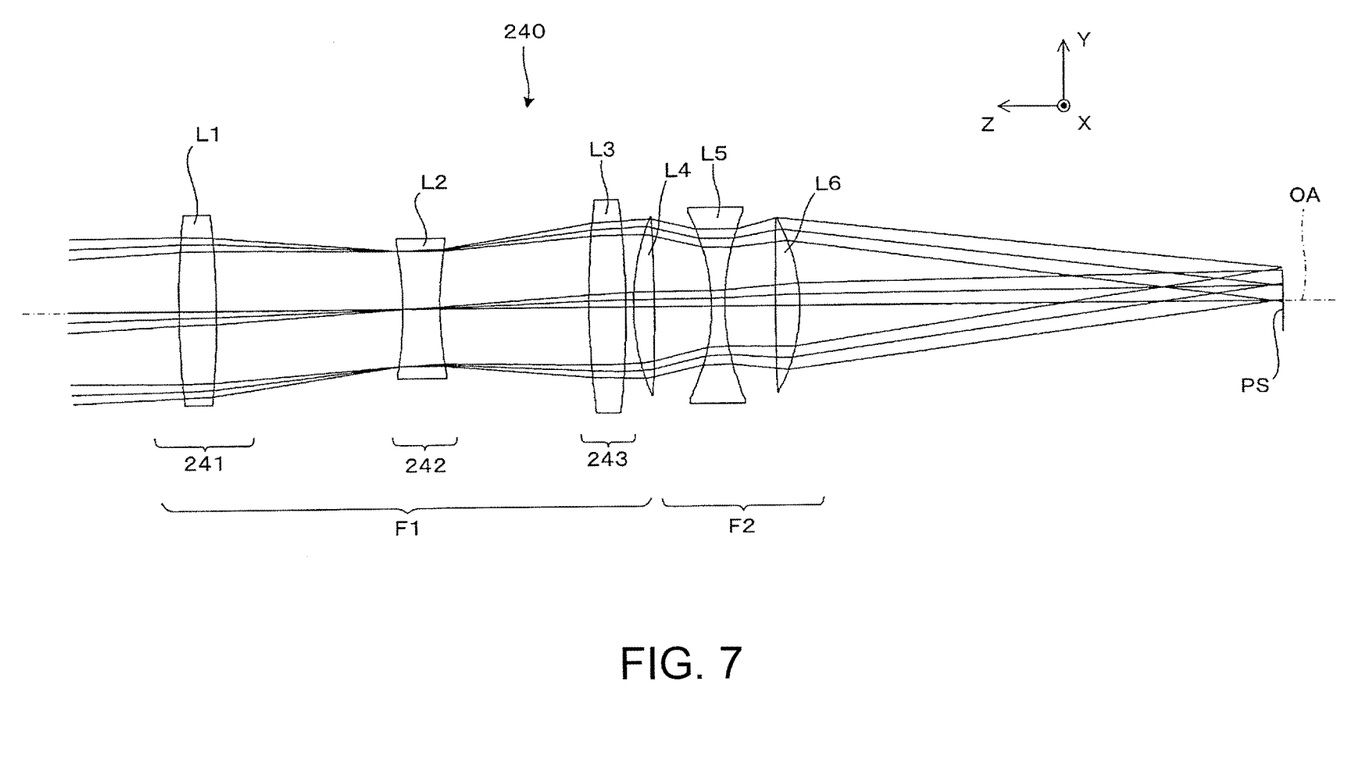
FIG. 7 shows the configuration of a projection system in a third embodiment and light rays traveling therethrough.

FIG. 7 is a view corresponding to FIG. 3 and is a cross-sectional view taken along the direction along a meridian surface of the constituent optical systems (vertical direction). The projection system 240 shown in FIG. 7 is formed of a field curvature control section F1 and an image formation section (image formation system) F2 arranged in this order from the magnifying side (image side), and the field curvature control section F1 is formed of first to third lens groups 241 to 243, which are formed of anamorphic lenses, as in the case shown in FIG. 3 and other figures. The present embodiment differs from the first embodiment and the other embodiment in that the second lens group 242 is formed of one lens. That is, the first and third lens groups 241, 243, each of which is a fixed group, are each formed of one positive lens (biconvex lens), and the second lens group 242, which is a movable group, is formed of one negative lens (biconcave lens). Also in this case, the field curvature control section F1 as a whole is an afocal system, and moving the second lens group 242, which is formed of one negative lens, between the first lens group 241 and the third lens group 243, each of which is a fixed group, allows the same action as the action in the other embodiments. In the examples shown in FIG. 7, the first lens group 241 and the third lens group 243 have shapes slightly different from each other. Instead, the first lens group 241 and the third lens group 243 may have the same shape and may be made of the same material, and the second lens group 242 may have symmetrical lens surfaces.

Others

The invention is not limited to the embodiments described above and can be implemented in a variety of aspects to the extent that they do not depart from the substance of the invention.

In the above description, in the projection system, the field curvature control section, that is, the first to third lens groups are located on the image side (rearmost segment on optical path of projection light), but not necessarily, and the field curvature control section may be disposed in an intermediate portion of the projection system or on the object side. For example, from a viewpoint of the focal length changing function of the field curvature control section, the field curvature control section may be considered in a sense as one form of implementation of a zoom function and may be configured as part of a zoom lens. Further, to correct aberrations (such as astigmatism) other than the field curvature (distortion), a correction optical system may be provided along with the first to third lens groups in the field curvature control section, or the projection system as a whole may be responsible for aberration correction. That is, the other aberrations may be corrected by the field curvature control section alone or by the projection system as a whole.

Figure 8A:
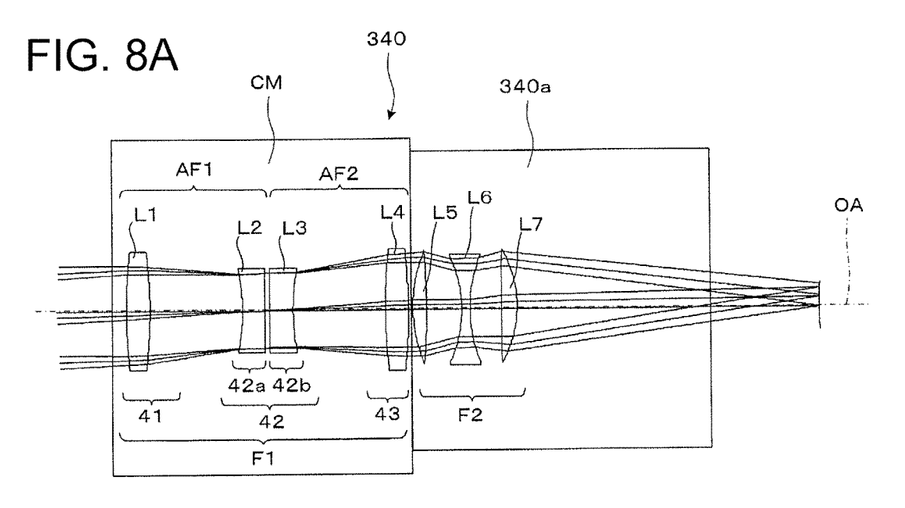
FIG. 8A shows a variation of the projection system in any of the embodiments described above.
Figure 8B:
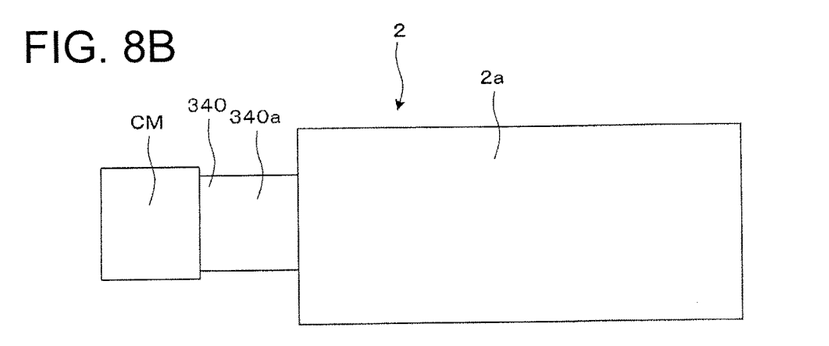
FIG. 8B is a conceptual view showing the state in which a conversion lens for a projector is attached.
Figure 8C:
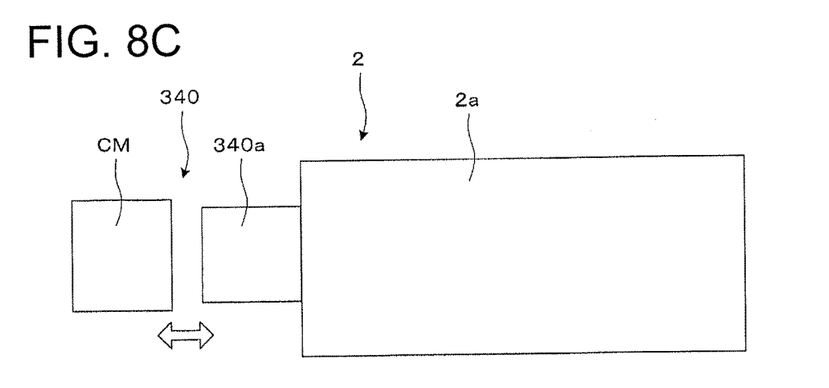
FIG. 8C is a conceptual view showing the state in which the conversion lens for a projector is removed.

For example, in a case where the field curvature control section is disposed in the rearmost segment on the optical path of the projection light and the other aberrations resulting from desired field curvature (distortion) are corrected by the field curvature control section alone, it is conceivable that the portion corresponding to the field curvature control section F1 (first to third lens groups 41 to 43) is configured as a removable conversion lens (converter) CM for a projector, as shown in FIGS. 8A to 8C by way of example. That is, it is conceivable that a projection system 340 includes a main body section 340a, which is capable of projection on a typical flat surface, and the conversion lens CM for a projector, which is attached to the front end of the main body section 340a, as shown in FIG. 8A, and that the conversion lens CM for a projector, which allows field curvature control, is configured to be attachable to and detachable from the main body section 340a attached to a main body section 2a of the projector 2, as shown in FIGS. 8B and 8C. In this case, when the conversion lens CM for a projector is attached, as shown in FIG. 8B, an image can be projected on a light irradiated surface having a variety of curved surface shapes. On the other hand, to perform projection on a typical flat surface, the conversion lens CM for a projector is not necessarily required, and image projection can be performed with the conversion lens CM for a projector removed, as shown in FIG. 8C.

Further, in the projection system, the field curvature control section formed of anamorphic lenses may be configured to be rotatable. That is, the meridian surface of the field curvature control section F1 may be configured to be rotatable around the optical axis OA. For example, only the conversion lens CM for a projector out of the structure shown in FIG. 8A may be configured to be rotatable around the optical axis OA as an axis of rotation. In this case, the direction in which the image plane is curved can be rotated.

In the above description, a transmissive liquid crystal projector is presented by way of example. The projection system according any of the embodiments according to the invention of the present application can be used in a projector of a type different from a transmissive projector. Specifically, the projection system can be used not only in a reflective liquid crystal projector but also in a projector using a digital micromirror device and a variety of other projectors.

In addition to the above description, the invention of the present application is applicable, for example, to a single-panel projector in which incident illumination light is modulated with a liquid crystal light valve including a color filter and the modulated light is projected through a projection system.

In the above description, the configuration in which the illumination light undergoes color separation has been described. The invention of the present application is also applicable to a projector that does not perform color separation but includes color light sources.

In addition to the above description, for example, the primary controller 88 may include an imaging camera and a shape acquisition section for acquiring information on the surface shape of a light irradiated surface, such as a screen, on the basis of distance measured with the imaging camera and may adjust the amount of movement of the field curvature control section F1 on the basis of the acquired information on the surface shape of the light irradiated surface.

The entire disclosure of Japanese Patent Application No. 2016-019525, filed Feb. 4, 2016 is expressly incorporated by reference herein.

What is claimed is:

1. A projection system including lens groups each formed of an anamorphic lens having curvature of a meridian surface and curvature of a sagittal surface different from each other, the projection system comprising:
   a first lens group having positive or negative power;
   a second lens group having power that differs from the power of the first lens group in terms of sign; and
   a third lens group having power that coincides with the power of the first lens group in terms of sign,
   wherein the second lens group is so disposed to be movable between the first lens group and the third lens group, and
   wherein the second lens group is formed of a second-first lens group paired with the first lens group to form a first afocal system and a second-second lens group paired with the third lens group to form a second afocal system.

2. The projection system according to claim 1, wherein the second lens group is movable as a whole.

3. A projector comprising:
   an illumination system that outputs light;
   a light modulator that modulates the light outputted from the illumination system; and
   the projection system according to claim 2, which projects the light modulated by the light modulator.

4. The projection system according to claim 1, wherein the third lens group is so arranged as to be fixed with respect to the first lens group.

5. A projector comprising:
   an illumination system that outputs light;
   a light modulator that modulates the light outputted from the illumination system; and
   the projection system according to claim 4, which projects the light modulated by the light modulator.

6. The projection system according to claim 1, wherein the first afocal system and the second afocal system are formed of a same combination of lenses having same shapes.

7. A projector comprising:
   an illumination system that outputs light;
   a light modulator that modulates the light outputted from the illumination system; and
   the projection system according to claim 6, which projects the light modulated by the light modulator.

8. The projection system according to claim 1, wherein each of the anamorphic lenses includes a toric lens.

9. A projector comprising:
   an illumination system that outputs light;
   a light modulator that modulates the light outputted from the illumination system; and
   the projection system according to claim 8, which projects the light modulated by the light modulator.

10. The projection system according to claim 1, wherein each of the anamorphic lenses includes an aspherical lens.

11. A projector comprising:
    an illumination system that outputs light;
    a light modulator that modulates the light outputted from the illumination system; and
    the projection system according to claim 10, which projects the light modulated by the light modulator.

12. The projection system according to claim 1, wherein the meridian surface of each of the anamorphic lenses is rotatable around an optical axis.

13. A projector comprising:
    an illumination system that outputs light;
    a light modulator that modulates the light outputted from the illumination system; and
    the projection system according to claim 12, which projects the light modulated by the light modulator.

14. The projection system according to claim 1, wherein further comprising an image formation system in a position shifted from the first to third lens groups toward an object side.

15. A projector comprising:
    an illumination system that outputs light;
    a light modulator that modulates the light outputted from the illumination system; and
    the projection system according to claim 1, which projects the light modulated by the light modulator.

16. A conversion lens used for a projector and including lens groups each formed of an anamorphic lens having curvature of a meridian surface and curvature of a sagittal surface different from each other, the conversion lens comprising:
    a first lens group having positive or negative power;
    a second lens group having power that differs from the power of the first lens group in terms of sign; and
    a third lens group having power that coincides with the power of the first lens group in terms of sign,
    wherein the second lens group is so disposed to be movable between the first lens group and the third lens group, and
    wherein the second lens group is formed of a second-first lens group paired with the first lens group to form a first afocal system and a second-second lens group paired with the third lens group to form a second afocal system.

17. A projection system including lens groups each formed of an anamorphic lens having curvature of a meridian surface and curvature of a sagittal surface different from each other, the projection system comprising:
    a first lens group having positive or negative power;
    a second lens group having power that differs from the power of the first lens group in terms of sign; and
    a third lens group having power that coincides with the power of the first lens group in terms of sign,
    wherein the second lens group is so disposed to be movable between the first lens group and the third lens group, and
    wherein the meridian surface of each of the anamorphic lenses is rotatable around an optical axis.

18. The projection system according to claim 17, wherein the second lens group is formed of one lens.

19. A projector comprising:
    an illumination system that outputs light;
    a light modulator that modulates the light outputted from the illumination system; and
    the projection system according to claim 18, which projects the light modulated by the light modulator.

* * * * *